Byrns & Stannard.
Churn.

N° 70,406.      Patented Nov. 5, 1867.

WITNESSES:
F. Lehmann
A. F. Yeatman

INVENTORS:
Philander Byrnes
Geo. Stannard.
Per
T. H. Alexander
atty

United States Patent Office.

PHILANDER BYRNS AND GEORGE STANNARD, OF MINDORA, WISCONSIN.

Letters Patent No. 70,406, dated November 5, 1867.

IMPROVEMENT IN CHURNS.

The Schedule referred to in these Letters Patent and making part of the same.

TO ALL WHOM IT MAY CONCERN:

Be it known that we, PHILANDER BYRNS and GEORGE STANNARD, of Mindora, Wisconsin, have invented certain new and useful Improvements in Churns; and we declare the following to be a full, true, and exact description of the same, reference being had to the accompanying drawings, and to the letters of reference marked thereon.

The object of our invention is to combine a churn with a rocking-chair, in such a manner that the churn can be worked easily and rapidly without the tiresome manual labor that is usually required.

Figure 1:
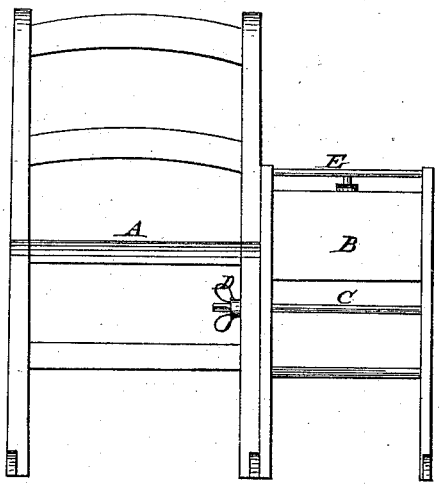
Figure 1 is a front elevation of our churn.
Figure 2:
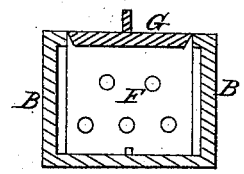
Figure 2 is a section view of the body of the churn.

A represents an ordinary rocking-chair, to which the churn B is attached by means of the iron rods C, which pass through both the front and hind legs of the churn and those of the chair, and are securely fastened by means of the thumb-screws or nuts D. The body of the churn consists of an oblong box, and has a round or handle, E, extending across each end, so that should the operator become tired of sitting down, he can operate the churn equally as well while standing up. Inside of the churn, as seen in fig. 2, is the perforated board F, which is placed in the middle of the box, so that the milk in rushing from one end to the other will be forced through these openings so as to break the globules. In order to prevent the board from being moved from its place by the force of the milk, a groove has been cut in the top of the box, in which it slides up and down, and small upright projections have been placed on each side, on the bottom, so that the board is held firmly and securely in its place. This board has an opening cut in its top, in which the bevelled top G rests, as seen in fig. 2.

Having thus described our invention, what we claim, and desire to secure by Letters Patent, is—

The churn B, perforated board F, handles E E, chair A, and connecting-rods C C, when all are constructed, arranged, and operated as and for the purpose set forth.

In testimony that we claim the above we hereby affix our signatures in the presence of two witnesses.

P. BYRNS,
GEORGE STANNARD.

Witnesses:
J. L. PETTINGILL,
A. S. W. COOK.